United States Patent
Yamaguchi et al.

[11] Patent Number: 6,111,050
[45] Date of Patent: Aug. 29, 2000

[54] FLOURINE-CONTAINING CURABLE COMPOSITIONS

[75] Inventors: Kouichi Yamaguchi; Noriyuki Koike; Masatoshi Arai; Hirofumi Kishita, all of Gunma-ken, Japan

[73] Assignee: Shin-Etsu Chemical Co., Ltd., Tokyo, Japan

[21] Appl. No.: 09/157,576

[22] Filed: Sep. 21, 1998

[30] Foreign Application Priority Data

Sep. 22, 1997 [JP] Japan ..................................... 9-275021

[51] Int. Cl.$^7$ ......................... C08G 18/32; C08G 18/38; C08G 18/50; C08G 18/60; C08G 59/18

[52] U.S. Cl. ................................ 528/68; 528/70; 528/73; 528/102; 528/116; 528/117; 528/118; 528/121; 528/123; 528/367; 528/401; 528/402

[58] Field of Search .................................. 528/27, 28, 42, 528/70, 68, 73, 116, 117, 118, 121, 123, 244, 299, 341, 342, 367, 401, 407, 422, 423, 402

[56] References Cited

U.S. PATENT DOCUMENTS

| | | | |
|---|---|---|---|
| 3,392,199 | 7/1968 | Middleton | 528/70 |
| 4,412,054 | 10/1983 | Yamabe et al. | 528/70 |
| 4,863,986 | 9/1989 | Re et al. | 524/197 |
| 4,942,164 | 7/1990 | Baum et al. | 528/70 |
| 5,656,711 | 8/1997 | Fukuda et al. | 528/15 |
| 5,665,846 | 9/1997 | Sato et al. | 528/15 |
| 5,705,586 | 1/1998 | Sato et al. | 528/15 |

*Primary Examiner*—Rabon Sergent
*Attorney, Agent, or Firm*—Birch, Stewart, Kolasch & Birch, LLP

[57] ABSTRACT

A fluorine-containing curable composition comprises (A) a linear perfluoro compound having at least two secondary amino groups per molecule and a divalent perfluoroalkylene or divalent perfluoropolyether structure in the main chain, and (B) a crosslinkable fluorinated compound having at least three functional groups which are crosslinkable with the secondary amino groups of (A). This composition readily cures, with standing at room temperature or heating only, to a cured product having excellent solvent and chemical resistance.

10 Claims, No Drawings

FLOURINE-CONTAINING CURABLE COMPOSITIONS

BACKGROUND OF THE INVENTION

1. Field of the Invention

The present invention relates to fluorine-containing curable compositions which readily cure, with standing at room temperature or heating only, to give cured products having excellent resistance to solvents and chemicals.

2. Prior Art

Fluorine-containing curable compositions are used in many areas of application. However, because the cured products obtained from prior-art compositions of this type generally lack sufficient resistance to solvents and chemicals, a need has been felt for the development of fluorine-containing curable compositions which provide cured products having excellent solvent and chemical resistance.

It is, therefore, an object of the present invention to provide fluorine-containing curable compositions which give cured products having excellent resistance to solvents and chemicals.

SUMMARY OF THE INVENTION

We have found that, by formulating (A) a linear perfluoro compound having at least two secondary amino groups per molecule and a divalent perfluoroalkylene or divalent perfluoropolyether structure in the main chain with (B) a crosslinkable fluorinated compound having at least three functional groups per molecule which are crosslinkable with the secondary amino groups of component (A), there can be obtained a fluorine-containing curable composition which readily cures, with standing at room temperature or heating only, to give a cured product that undergoes little change in volume in the presence of various solvents and little change in rubber hardness when exposed to acidic or alkaline chemicals, and thus has excellent solvent and chemical resistance.

Based on this discovery, the present invention provides a fluorine-containing curable composition comprising:

(A) a linear perfluoro compound having at least two secondary amino groups per molecule and a divalent perfluoroalkylene or divalent perfluoropolyether structure in the main chain, and (B) a crosslinkable fluorinated compound having at least three functional groups per molecule which are crosslinkable with the secondary amino groups of component (A).

Component (A) is typically a linear perfluoro compound of general formula (1):

(1)

wherein Rf is a divalent perfluoroalkylene or divalent perfluoropolyether group; X is a group selected from among those having general formula (2), (3) or (4); and m is an integer inclusive of 0.

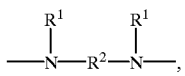
(2)

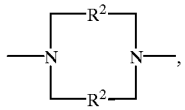
(3)

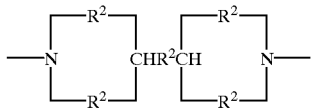
(4)

Herein, $R^1$ is a substituted or unsubstituted monovalent hydrocarbon group, and $R^2$ is a substituted or unsubstituted divalent hydrocarbon group.

DETAILED DESCRIPTION OF THE INVENTION

Component A of the curable compositions of the invention is a linear perfluoro compound having at least two secondary amino groups per molecule and a divalent perfluoroalkylene or divalent perfluoropolyether structure in the main chain. This compound is preferably one having general formula (1) below $$HXCRf(CXCRf)_m CXH \quad (1)$$

wherein Rf is a divalent perfluoroalkylene or divalent perfluoropolyether group;

X is a group selected from among those having general formula (2), (3) or (4)

(2)

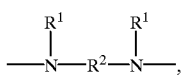
(3)

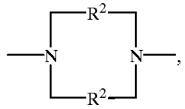
(4)

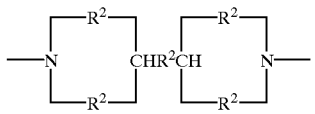

wherein $R^1$ is a substituted or unsubstituted monovalent hydrocarbon group, and $R^2$ is a substituted or unsubstituted divalent hydrocarbon group; and the letter m is an integer inclusive of 0.

In formula (1), Rf is a divalent perfluoroalkylene group or a divalent perfluoropolyether group. The divalent perfluoroalkylene group is preferably of the formula: $-C_nF_{2n}-$ wherein n is 1 to 10, and especially 2 to 6. The divalent perfluoropolyether group preferably has one of the following formulas:

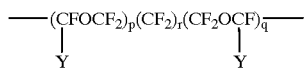

wherein Y is fluorine or a $CF_3$ group, and p, q, and r are integers in the ranges $p \geq 1$, $q \geq 1$, $2 \leq p+q \leq 200$, and especially $2 \leq p+q \leq 100$, and $0 \leq r \leq 6$;

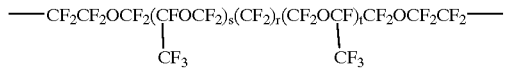

wherein r, s, and t are integers in the ranges $0 \leq r \leq 6$, $s \geq 0$, $t \geq 0$, and $0 \leq s+t \leq 200$, and especially $2 \leq s+t \leq 100$;

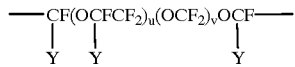

wherein Y is fluorine or a $CF_3$ group, and u and v are integers in the ranges $1 \leq u \leq 100$ and $1 \leq v \leq 100$; and

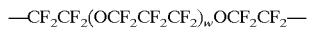

wherein w is an integer in the range $1 \leq w \leq 100$.

Illustrative examples of Rf include the following groups:

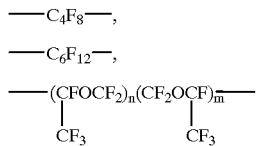

wherein n+m is from 2 to 200,

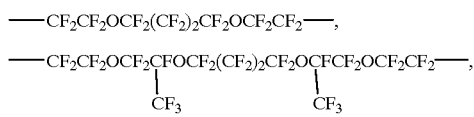

—$CF_2(OCF_2CF_2)_n(OCF_2)_mOCF_2$— wherein n is from 5 to 100, and m is from 1 to 100,

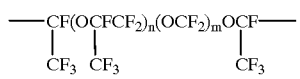

wherein n is from 5 to 100, and m is from 1 to 100, and —$CF_2CF_2(OCF_2CF_2CF_2)_nOCF_2CF_2$— wherein n is from 5 to 100.

In formula (1), X is a secondary amino group represented by general formula (2), (3) or (4).

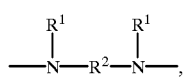

(2)

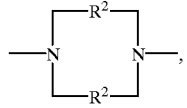

(3)

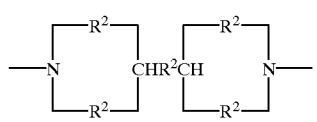

(4)

In formula (2), $R^1$ represents a substituted or unsubstituted monovalent hydrocarbon group having preferably 1 to 12 carbons, and more preferably 1 to 8 carbons. Illustrative examples include alkyl groups such as methyl, ethyl, propyl, isopropyl, butyl, isobutyl, tert-butyl, pentyl, neopentyl, hexyl, heptyl, octyl, nonyl, and decyl; cycloalkyl groups such as cyclopentyl, cyclohexyl, and cycloheptyl; aryl groups such as phenyl, tolyl, xylyl, and naphthyl; aralkyl groups such as benzyl, phenylethyl, and phenylpropyl; and these groups in which some or all of the hydrogen atoms are replaced with halogen atoms (e.g., fluorine, chlorine, and bromine), such as chloromethyl, bromoethyl, chloropropyl, trifluoropropyl, and 3,3,4,4,5,5,6,6,6-nonafluorohexyl.

In formulas (2) to (4) above, $R^2$ represents a substituted or unsubstituted divalent hydrocarbon group having preferably 1 to 10 carbons, and more preferably 2 to 6 carbons. Illustrative examples include alkylene groups such as methylene, ethylene, propylene, methylethylene, butylene, and hexamethylene; cycloalkylene groups such as cyclohexylene; arylene groups such as phenylene, tolylene, xylylene, naphthylene, and biphenylene; and these groups in which some of the hydrogen atoms are replaced with halogen atoms such as fluorine. The two $R^2$ groups in formula (3) and the five $R^2$ groups in formula (4) may, respectively, be mutually like or unlike.

Illustrative examples of the secondary amino group of formula (2), (3) or (4) represented by X in formula (1) include the groups shown below, wherein Me stands for methyl and Ph stands for phenyl.

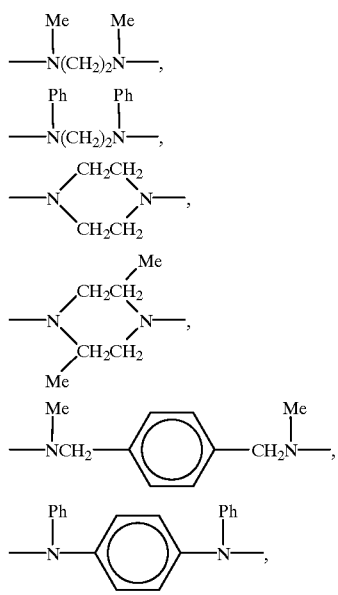

-continued

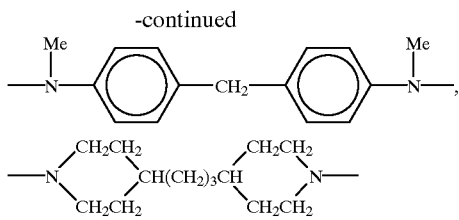

The letter m in above formula (1) is an integer inclusive of 0, preferably an integer from 0 to 10, and more preferably an integer from 0 to 6. Accordingly, the linear perfluoro compound of formula (1) contains at least one divalent perfluoroalkylene group or divalent perfluoropolyether group per molecule.

The fluorinated amide compounds of formula (1) according to the invention encompass compounds ranging from low-viscosity polymers having a viscosity within a range of about 100 to about 100,000 centistokes (cs) at 25° C. to solid, crude rubber-like polymers. For reasons having to do with the ease of handling, crude rubber-like polymers are preferred in the production of hot-vulcanized rubber, for example, whereas polymers having a viscosity within a range of about 100 to 100,000 cs at 25° C. are preferred in the production of liquid rubber. A compound having a viscosity of less than 100 cs at 25° C. may cure into a product which has a two low elongation for an elastomer, and thus fails to achieve a good balance of physical properties.

The linear perfluoro compound or fluorinated amide compound of formula (1) can be synthesized by the following method. As shown by the following scheme, a compound of general formula (5) having acid fluoride groups at both ends is reacted with a secondary diamine compound of general formula (6), optionally in the presence of an acid acceptor such as trimethylamine.

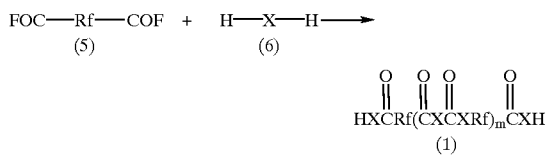

wherein X, Rf, and m are as defined above.

No particular limit is imposed on the proportions in which the compound of formula (5) having acid fluoride groups at both ends and the secondary diamine compound of formula (6) are charged in the above method, although the molar ratio (a)/(b) between the number of moles (a) of the formula (5) compound charged to the number of moles (b) of the formula (6) compound charged is preferably from 0.05 to 1, and more preferably from 0.1 to 0.5. The number (m) of repeating units in formula (1) can be set to a value suitable for the intended purpose by adjusting the ratio (a)/(b). For example, relatively low-molecular-weight polymers can be synthesized by making the (a)/(b) ratio small, and high-molecular-weight polymers can be synthesized by bringing the ratio closer to 1.

When the above reaction is carried out, the components may be diluted with an organic solvent, provided the solvent has no influence on the reaction. The use of an organic solvent which dissolves the components and the reaction product, and which can be uniformly dispersed, is of considerable advantage for enabling the reaction to proceed smoothly. Examples of suitable organic solvents include hydrocarbon solvents such as n-hexane, cyclohexane, toluene, petroleum ether, and xylene; ether-type solvents such as diethyl ether, n-butyl ether, dioxane, and tetrahydrofuran; ketone-type solvents such as acetone, methyl ethyl ketone, dibutyl ketone, and ethyl acetate; chlorohydrocarbon solvents such as methylene chloride, chlorobenzene, and chloroform; nitrile solvents such as acetonitrile; and fluorocarbon solvents such as trifluorobenzene, 1,3-bistrifluoromethylbenzene, and perfluorooctane. These solvents may be used alone or as mixtures of two or more thereof, if necessary.

Although the reaction conditions are not critical, the reaction is preferably carried out at a temperature of about 20 to 150° C. for a period of about 1 to 8 hours, and more preferably at about 20 to 100° C. for about 2 to 5 hours.

The crosslinkable fluorinated compound of component (B) according to the invention functions as the crosslinking agent for component (A). This fluorinated compound serving as component (B) has at least three functional groups per molecule which are capable of crosslinking reaction with the secondary amino groups of component (A), and preferably has one or more fluorinated groups selected from among monovalent perfluoroalkyl groups, monovalent perfluoropolyether groups, divalent perfluoroalkylene groups, and divalent perfluoropolyether groups.

Examples of the functional groups in the crosslinkable fluorinated compound of component (B) which are capable of crosslinking reaction with the secondary amino groups of component (A) include epoxy groups and isocyanate groups. Of these, the use of epoxy groups is preferred. Therefore, the crosslinkable fluorinated compound used as component (B) is preferably a fluorinated epoxy compound or a fluorinated isocyanate compound, and most preferably a fluorinated epoxy compound.

Examples of suitable monovalent perfluoroalkyl groups, monovalent perfluoropolyether groups, divalent perfluoroalkylene groups, and divalent perfluoropolyether groups which can be contained in the crosslinkable fluorinated compound of component (B) are given below. Monovalent perfluoroalkyl groups:

wherein m is an integer from 1 to 20, and preferably from 2 to 10.

Divalent perfluoroalkylene groups:

wherein m is an integer from 1 to 20, and preferably from 2 to 10.

Monovalent perfluoropolyether groups:

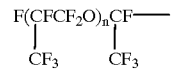

wherein n is an integer from 1 to 5.

Divalent perfluoropolyether groups:

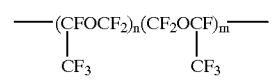

wherein m+n is an integer from 2 to 100.

Illustrative examples of such crosslinkable fluorinated compounds include those shown below, which may be used singly or as admixtures thereof. In the following formulas, Me stands for methyl and Ph stands for phenyl.

The crosslinkable fluorinated compound serving as component (B) is included in the fluorine-containing curable

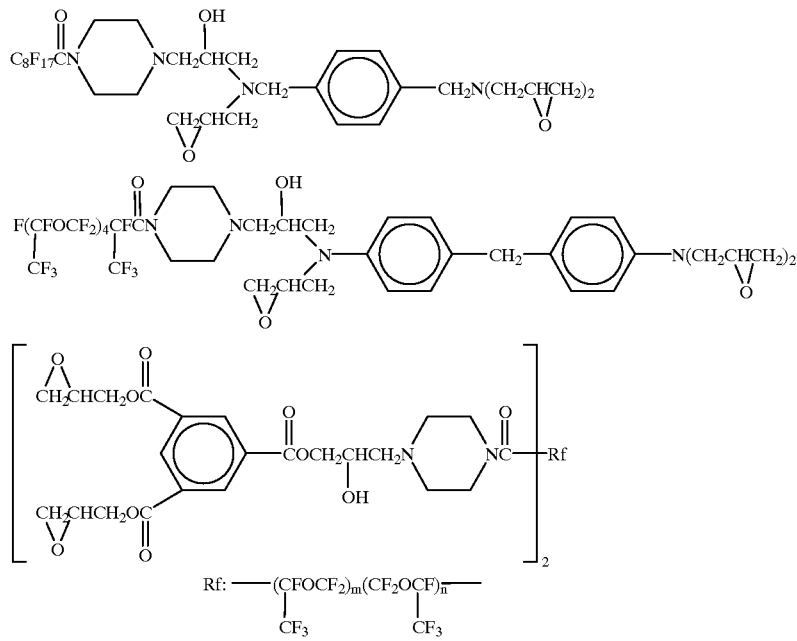

wherein m+n is from 2 to 50.

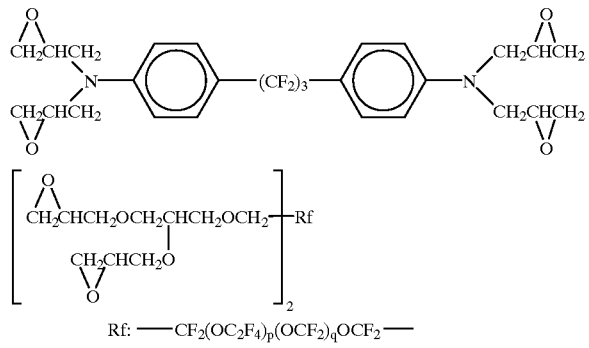

wherein p + q is from 5 to 20.

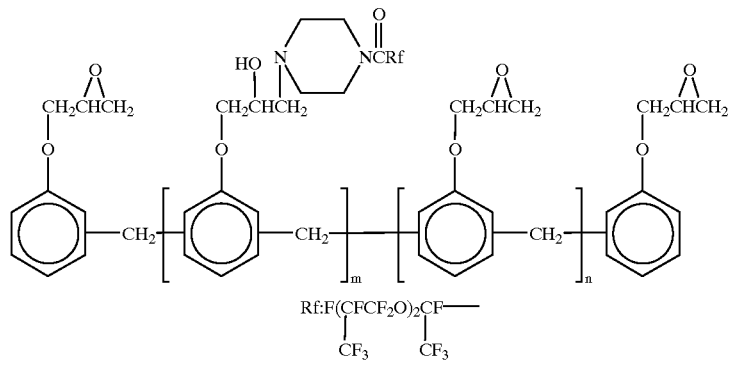

wherein $m \geq 1$ and $n \geq 1$.

composition of the invention in an amount such as to supply, per mole of the secondary amino groups within component (A), preferably from 0.5 to 5 moles, and especially from 1 to 2 moles, of the functional groups in component (B) capable of crosslinking with the secondary amino groups of component (A). At less than 0.5 mole, the degree of crosslinking would be too low, whereas at more than 5 moles, the crosslinking density would become too high, resulting in a cured product having inferior physical properties.

Together with the above-described essential components, the fluorine-containing curable composition of the invention may include also, as optional ingredients, various additives to improve its usefulness. Some exemplary additives are curing accelerators such as imidazoles and Lewis acids; carbon blacks such as acetylene black; reinforcing agents such as fumed silica, precipitated silica, titanium dioxide, aluminum oxide, quartz powder, carbon powder, talc, and bentonite; fibrous fillers-such as asbestos, glass fibers, and organic fibers; colorants such as pigments and dyes; heat resistance enhancers such as red oxide and cerium oxide; low-temperature resistance enhancers; rustproofing agents; and adhesion enhancers such as β-(3,4-epoxycyclohexyl)-ethyltrimethoxysilane, γ-glycidoxypropyltriethoxysilane, and γ-aminopropyltriethoxysilane. These optional ingredients may be added in conventional amounts to such an extent as not to impair the advantageous effects of the invention.

The fluorine-containing curable composition of the invention may be prepared by any suitable method, such as kneading together the above-mentioned ingredients. Alternatively, the composition may be prepared as a two-part system by, for instance, separately packing a liquid containing component (A) and a liquid containing component (B). The two liquids are later mixed to obtain the cured product.

Depending on the type of functional groups in component (B), the fluorine-containing curable composition of the invention can be cured at room temperature, although it is generally preferable to effect curing by heating the composition at 50 to 200° C. for a period of from several minutes to several hours.

For certain purposes and applications, the fluorine-containing curable composition of this invention may be used after adding a suitable fluorocarbon solvent, such as 1,3-bistrifluoromethylbenzene or perfluorooctane, to the composition to form a solution of a desired concentration.

Fluorine-containing curable compositions according to the invention are readily curable, with standing at room temperature or heating only to give cured products having excellent solvent and chemical resistance. They thus lend themselves well to use in such applications as automotive sealants, sealants for chemical equipment, electrical and electronic sealants, and potting agents. Moreover, their water repellency and alkali resistance make these compositions highly conducive also to use as electrode water repellents and binders in storage batteries such as lithium ion secondary cells and nickel-hydrogen secondary cells.

EXAMPLE

The following examples are provided to illustrate the invention, and are not intended to limit the scope thereof. In the formulas given below, Me is methyl and Ph is phenyl.

Example 1

Fifteen grams of acetylene black having a specific surface area of 130 m²/g was added to 100 g of the polymer having formula (i) below (viscosity, 12,900 cs at 25° C.; amine equivalent, 5,950) and 5.7 g of the crosslinking agent having formula (ii) below (epoxy equivalent, 341). These components were mixed in a three-roll mill, giving a fluorine-containing curable composition.

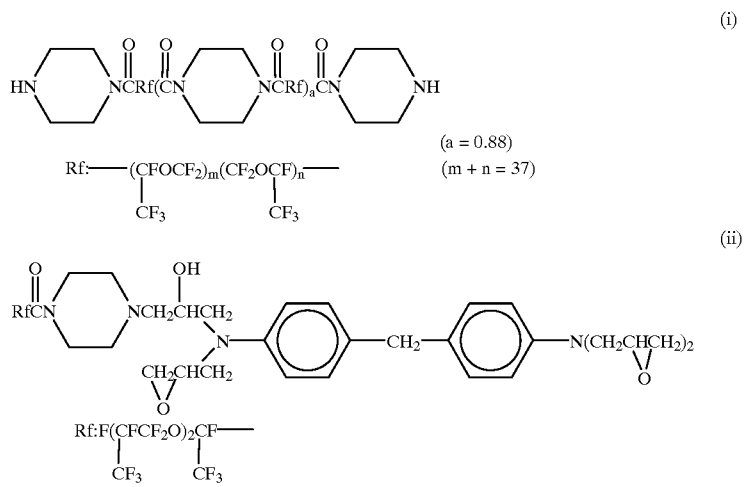

Example 2

A fluorine-containing curable composition was obtained by the same procedure as in Example 1, but without using acetylene black.

Example 3

A fluorine-containing curable composition was obtained by the same procedure as in Example 1, but using 100 g of the polymer having formula (iii) below (viscosity, 2,800 cs at 25° C.; amine equivalent, 4,120) instead of the polymer having formula (i), and 8.3 g of the crosslinking agent having formula (ii).

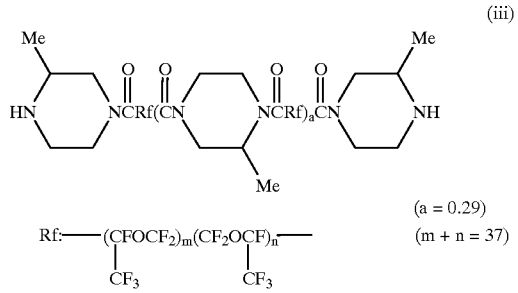

(iii)

(a = 0.29)
(m + n = 37)

Example 4

A fluorine-containing curable composition was obtained by the same procedure as in Example 1, but using 100 g of the polymer having formula (iv) below (viscosity, 30,160 cs at 25° C.; amine equivalent, 15,725) instead of the polymer having formula (i), and 2.0 g of the crosslinking agent having formula (v) below (epoxy equivalent, 321) instead of the crosslinking agent of formula (ii).

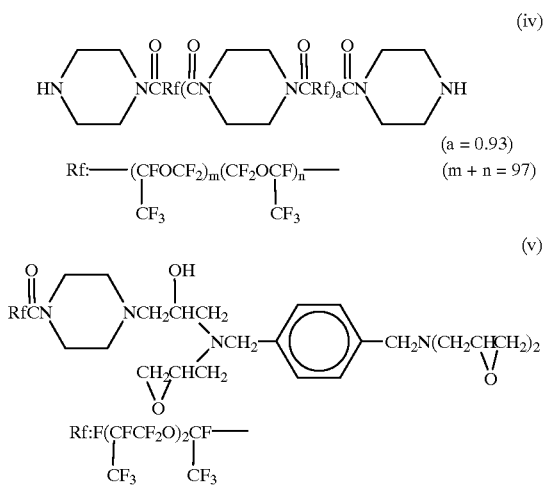

(iv)

(a = 0.93)
(m + n = 97)

(v)

The fluorine-containing curable compositions obtained in the above examples were then cured at 150° C. for 2 hours, and the physical properties of the cured products were examined. The results are shown in Table 1.

Solvent swellability and chemical resistance were measured for specimens of the cured product obtained from the composition prepared in Example 1. The results of these tests are shown in Tables 2 and 3.

TABLE 1

|  | Examples | | | |
| --- | --- | --- | --- | --- |
|  | 1 | 2 | 3 | 4 |
| Hardness (JIS-A) | 65 | 33 | 68 | 60 |
| Elongation (%) | 418 | 513 | 382 | 761 |
| Tensile strength (kgf/cm$^2$) | 93 | 24 | 76 | 60 |

TABLE 2

| Solvent | Example 1 Change in volume (%) |
| --- | --- |
| Toluene | +2 |
| Gasoline | +3 |
| Methanol | +4 |
| Acetone | +17 |
| Tetrahydrofuran | +24 |

Immersion conditions: 25° C. for 24 hours

TABLE 3

|  | Example 1 | |
| --- | --- | --- |
|  | Hardness | Surface state |
| Initial | 65 | — |
| Hydrochloric acid (36%) | 65(0) | no change |
| Sulfuric acid (98%) | 66(+1) | no change |
| Nitric acid (62%) | 64(−1) | no change |
| KOH, 40% aq. | 64(−1) | no change |

Values in parentheses ( ) show change in number of units.

Test conditions: 25° C. for 24 hours

Reference Example 1

Piperazine (16 g) and 400 g of 1,3-bistrifluoromethylbenzene were charged into a 2-liter, four-necked flask fitted with a stirrer, a thermometer, a Dimroth condenser, and a dropping funnel, following which the temperature was raised to 80° C. under stirring. A mixture of 500 g of the compound with acid fluoride groups at both ends represented by formula (vi) below and 500 g of 1,3-bistrifluoromethylbenzene was then added dropwise from the dropping funnel at a temperature of 80 to 90° C.

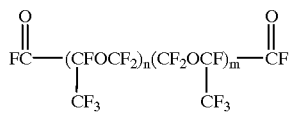

(vi)

(n + m = 97)

After addition, the reaction was carried out at 80° C. for 2 hours. The resulting reaction product was washed with water to remove salts and excess piperazine. The organic phase was separated off, then vacuum stripped at 100° C. and 3 mmHg, giving 467.4 g of a clear, light-yellow liquid compound.

This compound had a viscosity of 30,160 cs at 25° C. and a refractive index of 1.3073 at 25° C. Measurement of the IR spectrum for the compound showed the following absorption.

1100 to 1350 cm$^{-1}$ νC—F 1710 cm$^{-1}$ νC=O

The functional group equivalent weight of this compound was quantitatively determined and found to be 15,725 g/mol, thereby confirming the compound to be a polymer of the fluorinated amide compound having structural formula (vii) below.

(vii)

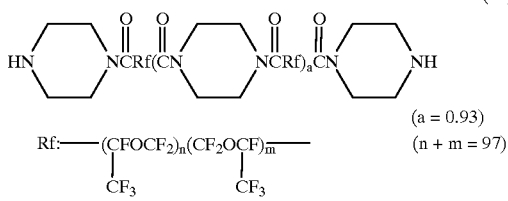

(a = 0.93)

Rf: —(CFOCF$_2$)$_n$(CF$_2$OCF)$_{\overline{m}}$— (n + m = 97)
          |                |
          CF$_3$           CF$_3$ Reference Example 2

2-Methylpiperazine (31.5 g) and 400 g of 1,3-bistrifluoromethylbenzene were charged into a 2-liter, four-necked flask fitted with a stirrer, a thermometer, a Dimroth condenser, and a dropping funnel, following which the temperature was raised to 80° C. under stirring. A mixture of 400 g of the compound with acid fluoride groups at both ends represented by formula (viii) below and 400 g of 1,3-bistrifluoromethylbenzene was then added dropwise from the dropping funnel at a temperature of 80 to 90° C.

(viii)

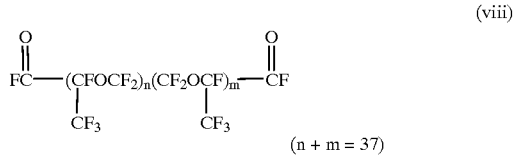

(n + m = 37)

After addition, the reaction was carried out at 80° C. for 2 hours. The resulting reaction product was washed with water to remove salts and excess 2-methylpiperazine, following which the organic phase was separated off, then vacuum stripped at 100° C. and 3 mmHg, giving 367.2 g of a clear, light-yellow liquid compound.

This compound had a viscosity of 2,800 cs at 25° C. and a refractive index of 1.3154 at 25° C. Measurement of the IR spectrum for the compound showed the following absorption.

1100 to 1350 cm$^{-1}$ vC—F 1700 cm$^{-1}$ vC=O

The functional group equivalent weight of this compound was quantitatively determined and found to be 4,120 g/mol, thereby confirming the compound to be a polymer of the fluorinated amide compound having structural formula (ix) below.

(ix)

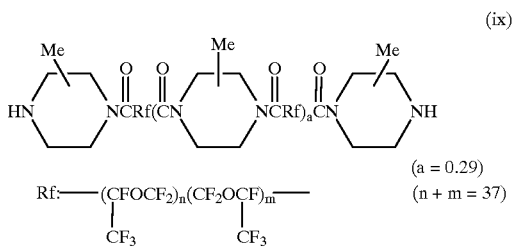

(a = 0.29)

Rf: —(CFOCF$_2$)$_n$(CF$_2$OCF)$_{\overline{m}}$— (n + m = 37)
          |                |
          CF$_3$           CF$_3$ Japanese Patent Application No. 275021/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A fluorine-containing curable composition comprising:
   (A) a linear fluoro compound having the following formula (1):

(1)

$$\text{HXCRf(CXCRf)}_m\text{CXH}$$

wherein

Rf is a divalent perfluoroalkylene group or a divalent perfluoropolyether group, and X is selected from the group consisting of the following formula (2), (3) and (4):

(2)

(3)

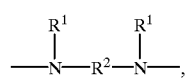

(4)

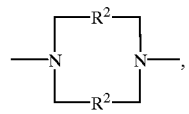

wherein $R^1$ is a substituted or unsubstituted monovalent hydrocarbon group, $R^2$ is a substituted or unsubstituted divalent hydrocarbon group, and m is an integer inclusive of 0; and (B) a crosslinkable fluorinated compound having at least three functional groups per molecule which are crosslinkable with the secondary amino groups of component (A), wherein said crosslinkable fluorinated compound is a fluorinated epoxy compound or a fluorinated isocyanate compound.

2. The fluorine-containing curable composition according to claim 1, wherein said divalent perfluoroalkylene group has the formula: —$C_nF_{2n}$—, wherein n is an integer from 1 to 10.

3. The fluorine-containing curable composition according to claim 1, wherein said divalent perfluoropolyether group is selected from one of the following:

(i) a group having the formula:

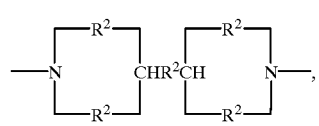

wherein

Y is fluorine or a CF$_3$ group, $p \geq 1$, $q \geq 1$, $2 \leq p+q \leq 200$, and $0 \leq r \leq 6$;

(ii) a group having the formula:

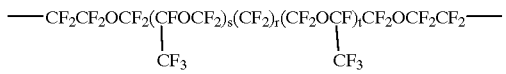

wherein $0 \leq r \leq 6$,
$s \geq 0$,
$t \geq 0$, and
$2 \leq s+t \leq 200$;

iii) a group having the formula:

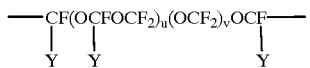

wherein

Y is a fluorine or a $CF_3$ group,
$1 \leq u \leq 100$,
$1 \leq v \leq 100$; or (iv) a group having the formula:

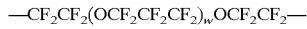

wherein $1 \leq w \leq 100$.

4. The fluorine-containing curable composition according to claim 1, wherein said fluorinated epoxy compound has at least three epoxy groups as functional groups.

5. The fluorine-containing curable composition according to claim 1, wherein said fluorinated isocyanate compound has at least three isocyanate groups as functional groups.

6. The fluorine-containing curable composition according to claim 1, wherein said fluorinated epoxy compound and said fluorinated isocyanate compound each have at least one group selected from the group consisting of a monovalent perfluoroalkyl group, a divalent perfluoroalkylene group, a monovalent perfluoropolyether group, and a divalent perfluoropolyether group.

7. The fluorine-containing curable composition according to claim 6, wherein said monovalent perfluoroalkyl group has the formula: $C_{m'}F_{2m'+1}$—, wherein m' is an integer from 1 to 20.

8. The fluorine-containing curable composition according to claim 6, wherein said divalent perfluoroalkylene group has the formula: —$C_{m''}F_{2m''}$—, wherein m" is an integer from 1 to 20.

9. The fluorine-containing curable composition according to claim 6, wherein said monovalent perfluoropolyether group has the formula:

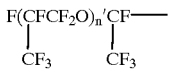

wherein n' is an integer from 1 to 5.

10. The fluorine-containing curable composition according to claim 6, wherein said divalent perfluoropolyether group has the formula:

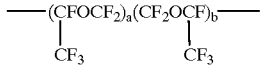

wherein a+b is an integer from 2 to 100.

* * * * *